US011165849B2

(12) United States Patent
Rowny et al.

(10) Patent No.: US 11,165,849 B2
(45) Date of Patent: Nov. 2, 2021

(54) ACCELERATED CLOUD DATA TRANSFERS USING OPTIMIZED FILE HANDLING AND A CHOICE OF SPEEDS ACROSS HETEROGENEOUS NETWORK PATHS

(71) Applicant: Pixspan, Inc., Rockville, MD (US)

(72) Inventors: Michael J. Rowny, Rockville, MD (US); Joseph Kralowetz, Clarksville, MD (US)

(73) Assignee: Pixspan, Inc., Rockville, MD (US)

( * ) Notice: Subject to any disclaimer, the term of this patent is extended or adjusted under 35 U.S.C. 154(b) by 4 days.

(21) Appl. No.: 16/528,300

(22) Filed: Jul. 31, 2019

(65) Prior Publication Data
US 2020/0045100 A1 Feb. 6, 2020

Related U.S. Application Data

(60) Provisional application No. 62/712,712, filed on Jul. 31, 2018.

(51) Int. Cl.
*G06F 15/16* (2006.01)
*H04L 29/08* (2006.01)
*G06F 16/11* (2019.01)

(52) U.S. Cl.
CPC .......... *H04L 67/06* (2013.01); *G06F 16/119* (2019.01); *H04L 67/1097* (2013.01)

(58) Field of Classification Search
CPC ..... H04L 67/06; H04L 67/1097; H04L 47/36; H04L 47/365; H04L 29/08117; G06F 16/119

USPC ........................................................ 709/227
See application file for complete search history.

(56) References Cited

U.S. PATENT DOCUMENTS

| | | | |
|---|---|---|---|
| 7,840,646 B2 * | 11/2010 | Davis | H04L 67/02 709/217 |
| 2003/0126247 A1 * | 7/2003 | Strasser | G06F 11/1458 709/223 |
| 2005/0083850 A1 * | 4/2005 | Sin | H04L 47/14 370/252 |
| 2015/0372910 A1 * | 12/2015 | Janakiraman | H04L 45/74 370/392 |
| 2016/0224578 A1 * | 8/2016 | Wideman | G06F 16/1734 |
| 2017/0293766 A1 * | 10/2017 | Schnjakin | G06F 21/335 |

* cited by examiner

*Primary Examiner* — Anh Nguyen
(74) *Attorney, Agent, or Firm* — Oblon, McClelland, Maier & Neustadt, L.L.P.

(57) ABSTRACT

An system and method of adaptively transporting large data assets to meet desired transfer speed and cost, includes selecting folders containing files having the data, receiving input of the desired transfer speed and cost, selecting a destination memory device, reading a file header of the files for the selected folders to obtain header information, determining a file type and file size based on the header information, determining a large file size threshold based on the desired transfer speed and cost and previously measured transfer speed. When the file size of a file is above the large file size threshold, dividing the file into two or more file parts in accordance with the file type, transferring the one or more files, including any of the file parts, using a number of parallel transport machine instances, measuring a total speed of the transfer, and storing the measured total speed for use as the previously measured transfer speed.

18 Claims, 5 Drawing Sheets

ACCELERATED CLOUD DATA TRANSFERS USING OPTIMIZED FILE HANDLING AND A CHOICE OF SPEEDS ACROSS HETEROGENEOUS NETWORK PATHS

CROSS-REFERENCE TO RELATED APPLICATIONS

This application claims the benefit of priority to provisional Application No. 62/712,712, filed Jul. 31, 2018, the entire contents of which are incorporated herein by reference.

BACKGROUND

Technical Field

The present disclosure is directed to a method and system for accelerating data transfers over a telecommunications network and over the Internet, selectively and simultaneously, employing different data handling and transfer methodologies.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

As industries and enterprises store more and more data it becomes increasingly difficult to move to cloud storage. There are significant technological and financial hurdles involved in movement and storage of data sets larger than 100 GBytes. There is a need to provide more speed for large data transfers on demand, using terrestrial or cloud network resources. Data files continue to grow in size, driven by the greater volume of digital transactions and software applications. As an example, in recent years, there has been double digit growth in the data storage market, both on site and in the cloud.

Moving large amounts of data is currently accomplished in a number of ways: with point-to-point network with leased lines and over the unmanaged internet. Both of these methods involve a fixed amount of bandwidth. Network optimization software is often used to increase transfer speeds, typically by using the User Datagram Protocol (UDP) designed to make use of more of the available bandwidth.

It is one object of the present disclosure to provide a method of creating on-demand transfers by initiating multiple parallel transfers with transfer software and computing resources as one side of the transfer only. This makes optimal use of network optimization software, saving on cost and complexity.

SUMMARY

In an exemplary embodiment, an system transfers data to meet desired transfer speed and cost, the system includes circuitry configured to select one or more folders containing one or more files having the data, receive input of the desired transfer speed and cost, select a destination memory device, read a file header of the one or more files for the selected folders to obtain header information, determine a file type and file size based on the header information, determine a large file size threshold based on the desired transfer speed and cost and previously measured transfer speed, when the file size of a file of the one or more files is above the large file size threshold, divide the respective file into two or more file parts in accordance with the file type, transfer the one or more files, including any of the file parts, using a number of parallel transport machine instances, measure a total speed of the transfer, and store the measured total speed for use as the previously measured transfer speed.

In a second aspect, the circuitry is further configured to determine a small file size threshold based on the desired transfer speed and cost and the previously measured transfer speed, when the file size of a file of the one or more files is below the small file size threshold, aggregate the respective file with at least one other file or file part to obtain an aggregated file, and transfer, from a source device to the destination memory device, the one or more files including the aggregated file using the number of parallel transport machine instances, which are executing on the destination memory device.

In a third aspect, the large file size threshold is less than a memory size of the system such that there is no buffering.

In a fourth aspect, the circuitry is further configured to dynamically adjust the number of parallel transport machine instances for each file of the one or more files to meet the desired transfer speed and cost.

In a fifth aspect, the circuitry is further configured to vary the large file size threshold based on a history of the measured transfer speed and a previous large file size threshold.

In a sixth aspect, the circuitry is further configured to determine transfer parameters including one or more of efficiency of a cloud provider's transfer network, a time of day, segment city pairs, an amount of storage and related compute functions, a size and type of compute instances, and pricing of the compute instances and transfer charges, adjust one or more values of the transfer parameters to meet the desired transfer speed and cost, and transfer the one or more files using the adjusted transfer parameters.

In a seventh aspect, the circuitry is further configured to determine whether the determined file type indicates a file that can be bit-exact compressed, when the file size of a file of the one or more files is above a large file size threshold, apply bit-exact compression to the respective file, and transfer the one or more files including the compressed file using the number of the parallel transport machine instances.

In an eighth aspect, the file type includes a raw image file, and wherein the circuitry is further configured to apply the bit-exact compression to the raw image file.

In a ninth aspect, the circuitry includes a machine learning model, wherein the circuitry determines the large file size threshold based on the desired transfer speed and cost and the previously measured transfer speed using the machine learning model, and wherein the circuitry transfer the one or more files including the file parts using the number of parallel transport machine instances, measures and stores the total speed of the transfer, and trains the machine learning model with the stored measured total speed.

In a tenth aspect, the circuitry includes a machine learning model, wherein the circuitry determines the small file size threshold based on the desired transfer speed and cost and the previously measured transfer speed using the machine learning model, wherein the circuitry transfer the one or more files including the aggregated file using the number of parallel transport machine instances, measures and stores the total speed of the transfer, and trains the machine learning model with a number of small files in the aggregated file and the stored measured total speed.

In another exemplary embodiment, a method for a system that transports data to meet desired transfer speed and cost is provided, the method includeing selecting one or more folders containing one or more files having the data; receiving input of the desired transfer speed and cost; selecting a destination memory device; reading a file header of the one or more files for the selected folders to obtain header information; determining a file type and file size based on the header information; determining a large file size threshold based on the desired transfer speed and cost and previously measured transfer speed; when the file size of a file of the one or more files is above the large file size threshold, dividing the respective file into two or more file parts in accordance with the file type; transferring the one or more files, including any of the file parts, using a number of parallel transport machine instances; measuring a total speed of the transfer; and storing the measured total speed for use as the previously measured transfer speed.

In a twelfth aspect, the method further includes determining a small file size threshold based on the desired transfer speed and cost and the previously measured transfer speed; when the file size of a file of the one or more files is below the small file size threshold, aggregating the respective file with at least one other file or file part to obtain an aggregated file; and transferring the one or more files including the aggregated file using the number of parallel transport machine instances.

In a thirteenth aspect, the method is such that the large file size threshold is less than a memory size of the system such that there is no buffering.

In a fourteenth aspect, the method further includes dynamically adjusting the number of parallel transport machine instances for each file of the one or more files to meet the desired transfer speed and cost.

In a fifteenth aspect, the method further includes varying the large file size threshold based on a history of the measured transfer speed and a previous large file size threshold.

In a sixteenth aspect, the method further includes determining transfer parameters including one or more of efficiency of a cloud provider's transfer network, a time of day, segment city pairs, an amount of storage and related compute functions, a size and type of compute instances, and pricing of the compute instances and transfer charges; adjusting one or more values of the transfer parameters to meet the desired transfer speed and cost; and transferring the one or more files using the adjusted transfer parameters.

In a seventeenth aspect, the method further includes determining whether the determined file type indicates a file that can be bit-exact compressed; when the file size of a file of the one or more files is above a large file size threshold, applying bit-exact compression to the respective file; and transferring the one or more files including the compressed file using the number of the parallel transport machine instances.

In an eighteenth aspect, the file type includes a raw image file, and the method further includes applying the bit-exact compression to the raw image file.

In a nineteenth aspect, the method further includes determining the large file size threshold based on the desired transfer speed and cost and the previously measured transfer speed using a machine learning model; transferring the one or more files including the file parts using the number of parallel transport machine instances; measuring and storing the total speed of the transfer; and training the machine learning model with the stored measured total speed.

In a twentieth aspect, the method further includes determining the small file size threshold based on the desired transfer speed and cost and the previously measured transfer speed using a machine learning model; transferring the one or more files including the aggregated file using the number of parallel transport machine instances; measuring and storing the total speed of the transfer; and training the machine learning model with a number of small files in the aggregated file and the stored measured total speed.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
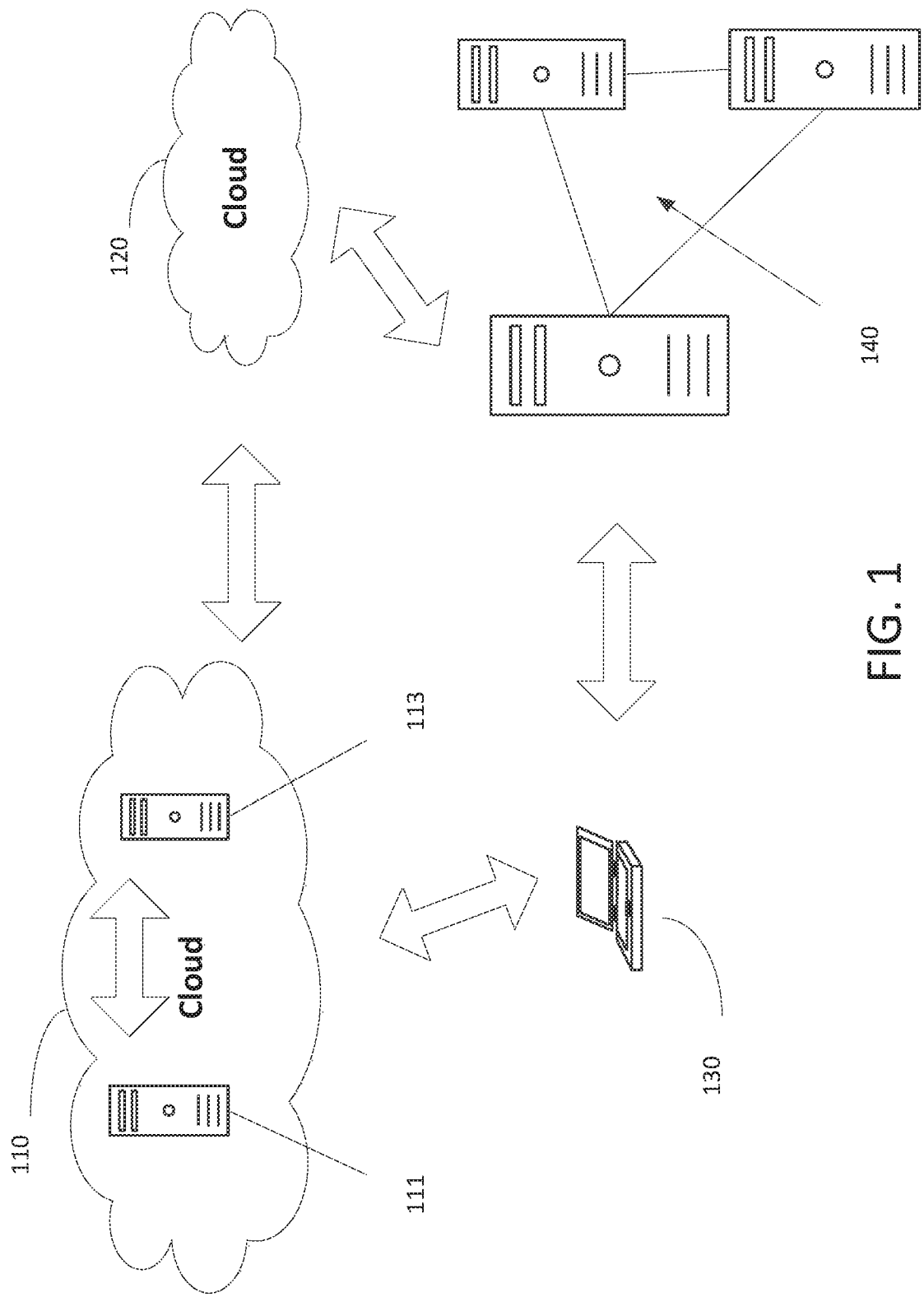
FIG. 1 is a diagram of an exemplary system.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of this disclosure are directed to a method and system for accelerating data transfers over the telecommunications network, over the Internet, and within the cloud, employing simultaneously and selectively different data handling and transfer methodologies, in order to optimize transfer speeds and costs.

FIG. 1 is a diagram of an exemplary data transfer system. An exemplary system can include various combinations of at least one public cloud service 110 having a network of physical or virtualized servers 111, 113, private cloud services 120, computer devices 130, and networked computer systems 140. Data transfer can be performed from one entity in the system to another entity. For example, data transfer can be performed between servers 111, 113 that are within a cloud service 110. Data transfer can be performed between cloud services 110, 120. Data transfer can be performed between computer devices 130 and a cloud service 130. Data transfer can be performed between a networked computer system 140 and a cloud service 120, 110. In some embodiments, data transfer operations can be implemented on one side of the transfer. In one embodiment, the data transfer operations are performed on the destination side of the transfer. A cloud service 110, 120 may provide compute instances and machine instances. A compute instance includes a virtual processor and associated memory. A machine instance may include an operating system and one or more applications to perform a task. In some embodiments, the compute instances and transfer machine instances are located on the destination side, meaning in proximity to the destination storage.

The method and system consists of a software application performed in a computer system or in a cloud service. The software application provides a user interface where a user can input a desired transfer speed and cost. In some embodiments, the desired transfer speed is achieved by varying a number of parallel storage reads and writes % hile deploying a similar number of software transfer machine instances and compute instances. In particular, a number of virtual CPUs can be allocated and data can be read from one or more source storage locations in parallel based on the number of virtual CPUs. Source storage locations can store files in folders, where files can be of various file types and sizes.

It should be understood that a physical computer system can vary in component makeup, processing power and memory size, but will at least include a central processing unit (CPU) and volatile memory for storing instructions and data to be processed by the CPU. In the case of a cloud service, the CPU can be a virtual CPU of a compute instance having associated memory. A CPU can include one or more processing cores. For purposes of this disclosure, a CPU and associated memory will also be referred to a processing circuitry that is capable of executing program instructions. Also, a physical computer system can optionally include a graphics processing unit (GPU) which can include one or more processing cores. A GPU can be implemented as a video processing component having its own dedicated memory. A physical computer system can be embedded within or be connected to a display device or interactive display device (i.e., touch screen).

Figure 2:
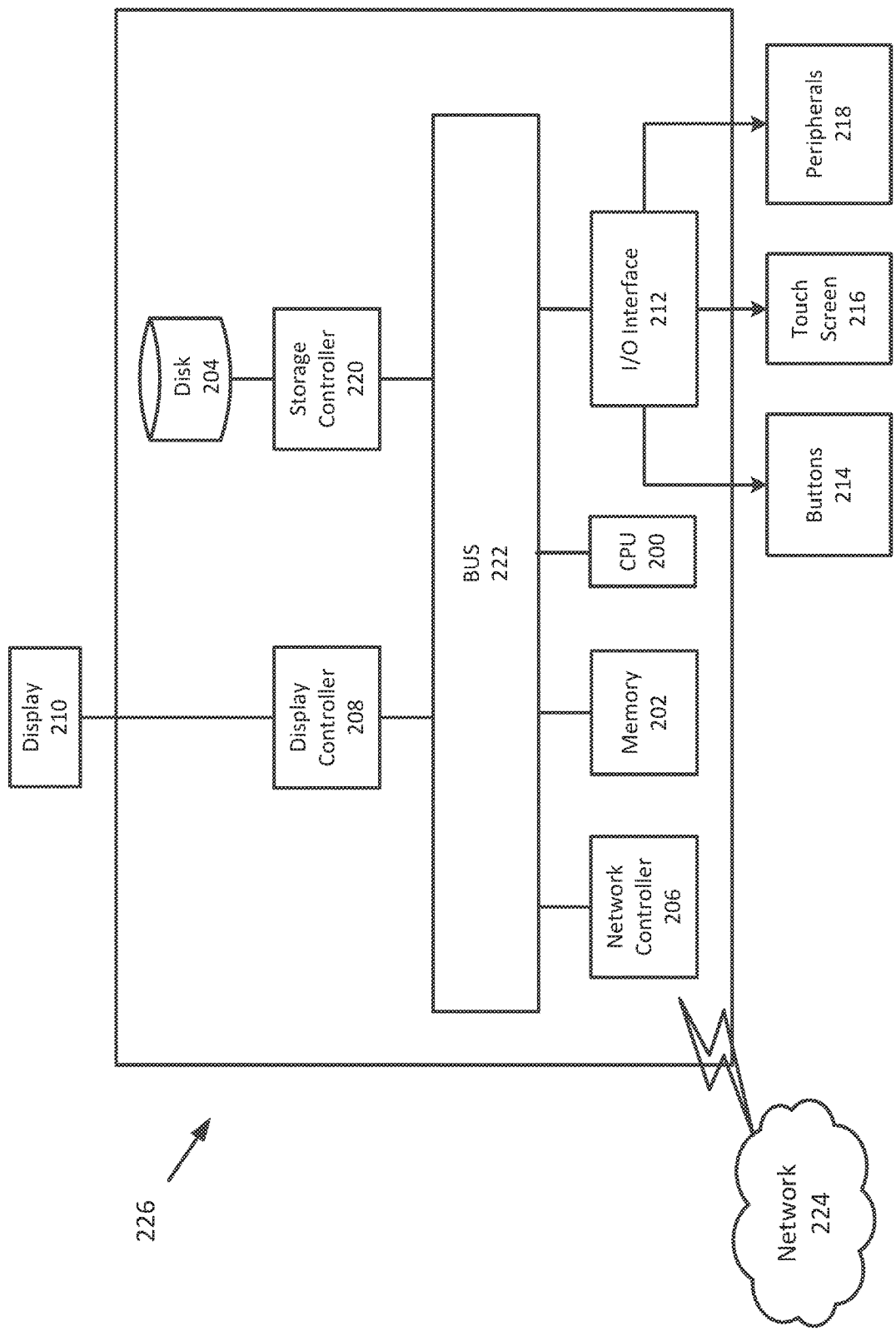
FIG. 2 is a block diagram of an exemplary computer system.

In one exemplary implementation, the functions and processes of the computer system can be implemented by a computer 226. A hardware description of the computer 226 according to exemplary embodiments is described with reference to FIG. 2. In FIG. 2, the computer 226 includes a CPU 200) which performs the processes described herein. The process data and instructions can be stored in memory 202. These processes and instructions can also be stored on a storage medium disk 204 such as a hard drive (HDD), solid state drive (SSD), or portable storage medium or can be stored remotely. Further, the claimed advancements are not limited by the form of the computer-readable media on which the instructions of the inventive process are stored. For example, the instructions can be stored on CDs, DVDs, in FLASH memory, RAM, ROM, PROM, EPROM, EEPROM, hard disk or any other information processing device with which the computer 226 communicates, such as a server or computer.

Further, the disclosed advancements can be provided as a utility application, background daemon, or component of an operating system, or combination thereof, executing in conjunction with CPU 200 and an operating system such as Microsoft® Windows®, UNIX®, Oracle® Solaris, LINUX®, Apple macOS® and other systems known to those skilled in the art.

In order to achieve the computer 226, the hardware elements can be realized by various circuitry elements, known to those skilled in the art. For example, CPU 200 can be a Xenon® or Core® processor from Intel Corporation of America or an Opteron® processor from AMD of America, or can be other processor types that would be recognized by one of ordinary skill in the art. Alternatively, the CPU 200 can be implemented on an FPGA, ASIC, PLD or using discrete logic circuits, as one of ordinary skill in the art would recognize. Further, CPU 200 can be implemented as multiple processors cooperatively working in parallel to perform the instructions of the inventive processes described above.

The computer 226 in FIG. 2 also includes a network controller 206, such as an Intel Ethernet PRO network interface card from Intel Corporation of America, for interfacing with network 224. As can be appreciated, the network 224 can be a public network, such as the Internet, or a private network such as LAN or WAN network, or any combination thereof and can also include PSTN or ISDN sub-networks. The network 224 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 226 further includes a display controller 208, such as a NVIDIA® GeForce® GTX or Quadro® graphics adaptor from NVIDIA Corporation of America for interfacing with display device 210, such as a Hewlett Packard® HPL2445w LCD monitor. In some implementations, the computer 226 can be embedded in a display device 210. A general purpose I/O interface 212 interfaces with a keyboard and/or mouse 214 as well as an optional touch screen panel 216 on or separate from display device 210. General purpose I/O interface also connects to a variety of peripherals 218 including printers and scanners, such as an OfficeJet® or DeskJet, from Hewlett Packard®.

The general purpose storage controller 220 connects the storage medium disk 204 with communication bus 222, which can be an ISA, EISA, VESA, PCI, or similar, for interconnecting all of the components of the computer 226. A description of the general features and functionality of the display 210, keyboard and/or mouse 214, as well as the display controller 208, storage controller 220, network controller 206, and general purpose I/O interface 212 is omitted herein for brevity as these features are known.

The software application can be performed on a computer system such as that in FIG. 2 to operate, measure and record the speed of a discrete data transmission from an origin location at a network node or a cloud storage bucket to a destination network node or storage bucket. For purposes of this disclosure, a network node is a computer system that can be connected to a computer network. The computer network can be of any type of computer network such as, but not limited to, wireless computer network, Ethernet connected network, satellite service. A cloud storage bucket can be an object storage that stores structured or unstructured objects having data and associated descriptive metadata. Other storage options can include, but are not limited to, a relational database, a NoSQL database, file folders, to name a few.

The software application can be executed to perform a process that manages multiple parallelized copy and transfer functions at each network node and end point, a process that applies the selective use of bit exact data compression, a process that applies methods to break files temporarily into smaller pieces or aggregate smaller files into larger files for optimal transfer, a process that directs compute resources at one site, the destination side, of the transfer, some or all of whose functions enable the intelligent choice of different compute and storage capabilities made available by one or more cloud services or network providers. A control software application can include predetermined default configurations or parameters modified by a machine learning model to optimize all of these processes in an ongoing method of continuous improvement to obtain optimal speeds or costs of transfers.

Figure 3:
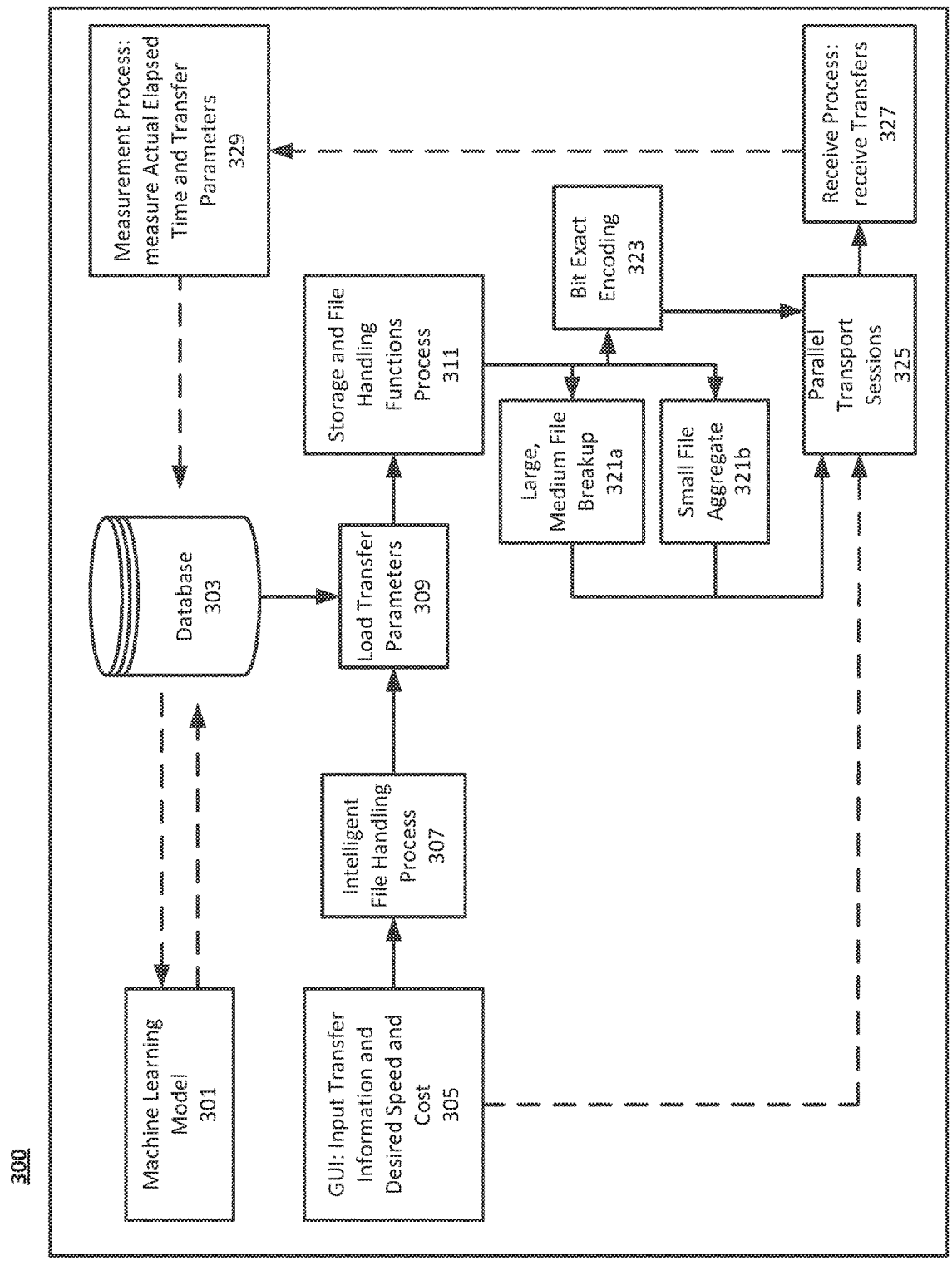
FIG. 3 is a schematic diagram for data transfer processing at the destination side, in accordance with an exemplary aspect of the disclosure.

FIG. 3 is a schematic diagram for data transfer processing at the destination side, in accordance with an exemplary aspect of the disclosure. Embodiments of the data transfer software application 300 are performed at the destination side of a data transfer operation and include a graphical user interface 305, an intelligent file handling process 307, File Breakup 321a process, File Aggregate 321b process, a Bit Exact Encoding process 323, transport session machine instances 325, transport receivers and compute instances 327, a database system 303, and a machine learning model 301.

The graphical user interface 305 is designed to achieve desired goals including the time for delivery and the cost for a given transfer of data from one location to another. The user interface provides a screen for a user to select the speed of the transfer for each folder and the destination such as a network node or cloud service or storage point. These user selected parameters are loaded into a database 303. In addition, the identifying names of users, network address of the server, and access codes and passwords of the origination, any intermediate node or cloud point, and destination are entered and stored in the database 303.

In some embodiments, a data transfer can be initiated manually or externally, for example by a policy-driven software-based system, such as network orchestration software. In the case of policy-driven data transfer, information in the database 303 of default modification is referred to based on previous transfers between the exact or similar locations, or information of a default set of parameters, can be used to initiate the transfer of files in folders.

Each folder being so transferred consists of one or more files. The intelligent file handling process 307, upon initiation of a data transfer, is configured to analyze the contents of each file in a folder. Each file typically has a header and/or footer and certain other markers such as its size in bytes, its file type, and other identifying information. The intelligent file handling process 307 first examines the identifying information and size of each file in a folder, and whether it can be successfully losslessly compressed and decompressed with available compute instances, referencing pre-established parameters 309 in the database 303.

The user interface 305 can include an option to choose lossless compression. If the user selects lossless compression and the data is compressible, then the file can be compressed using one or more bit-exact compression methods 323.

In some embodiments, the software application may determine if a file can be losslessly compressed is by examining the file's identifying format. Each file, when it is created, may be put into a characteristic file format dictated by a published standard. The format may be selected by the file originator, such as a camera, sensor, or other software application. One visible format indicator for a file is its characteristic file extension, the dot and letters after the file name, such as for Microsoft Word (.doc), Microsoft Excel (.xls), Adobe Acrobat (.pdf), or OpenEXR (.exr).

The digital identifier within the file is often called the "Magic Number", which appears in an easily accessible place within the data of the file, such as in the header. The Magic Number for OpenEXR image files, for example, is 20000630, and the first four bytes of the OpenEXR file are: 0x76, 0x2f, 0x31, and 0x01. Every Open EXR file has this digital signature. The typical image file formats are: OpenEXR, DPX, TIFF, Cineon, GeoTIFF, PPM, DICOM, and SGI. The typical uncompressed camera raw image formats are: ARRI, Canon Raw, and Varicom Raw. Each of these file formats may have been originally created by a camera, satellite, medical imaging device, or other sensor or an application designed to make the image readable by a monitor or projector. The software application may identify each of these images types by its Magic Number, to determine if it can be successfully losslessly compressed.

The lossless compression can be proprietary and in the spatial domain rather than the frequency domain, such as is disclosed in U.S. Pat. No. 9,516,197, incorporated herein by reference in its entirety. Bit-exact compression means mathematically lossless compression, wherein each bit of the original image is exactly reproduced upon reconstruction of the image. Bit-exact compression preserves all of the information of the original raw image. If the data to be transferred is not compressible, the file can be transmitted as is.

An ideal size of file or sub-file to be transmitted may be the largest file size that can be transferred at maximum speed, the "Large File Size". The software application may achieve this size by breaking up a large file into multiple equally sized pieces, except for the last piece which is the remainder. The database 303 may contain information on the maximum number of pieces into which a file may be divided, which is the "Maximum File Division Number". This measure is the largest number of parts of the file that will still transmit efficiently, beyond which the overhead of disassembling and reassembling the file parts causes the transfers to slow down. These parameters, including large file size and maximum file division number may be initially entered as a default values. Over time, these parameters may be modified by the machine learning model 301. If the software application finds that a file exceeds a certain large file size parameter as determined by information 309 retrieved from the database 303, the storage and file handling functions process 311 designates the file for breaking into smaller pieces. The value of the large file size parameter may be adaptively determined using the machine learning model 301 and stored in the database 303. If the file exceeds the large file size parameter, the large, medium file breakup process 321a will break the file into smaller pieces in such a way that it can be reassembled at another network point or at the destination as an exact replica of the original.

If the file is smaller than a certain small file size parameter, as determined by information 309 retrieved from the database 303, the storage and file handling functions process 311 designate the file for aggregation into a larger file. The value of the small file size parameter is adaptively determined using the machine learning model 301 and stored in the database 303 If the file is less than the small file size parameter, the small file aggregate process 321b will aggregate files for transfer to the destination.

Once the software application initiates the data transfer, it employs one or more simultaneous, parallelized transfers, with a choice of speed made by the user, which corresponds to a pre-set number of compute instances and machine instances 325. The software application effects the transfers by deploying one or more machine instances and one or more compute instances to drive the machine instances. A machine instance is software that is designed to read a file or file segment from the originating storage and write it into the storage at the destination end. By default, the software application deploys the transfer machine instances and the compute instances on the destination side, unless overridden by the software application.

When a transfer is completed, such that transfer receivers 327 receive all transported data, the measurement process 329 measures and records the time of the data transfer from the origination point to the destination. The measurement process 329 calculates the speed along with the number of parallel transfers and any other of the file handling methods selected. The transfer speed can be thus measured between each information and destination point and stored in the database 303 during as well as upon the completion of the transfer.

The software application also includes the bit-exact encoding 323 that uses mathematically lossless, or bit-exact, compression. The software application can take into account whether the data on the origination end is already losslessly compressed. If so, it will transfer the data to the destination end and un-compress, or decode, it at that receiving end, unless the user selects to retain the data in its compressed state. The software application monitors this data throughout the transfer and records the speed so that the amount of compute instances and machine instances can be varied to achieve the optimal result.

The software application can simultaneously monitor the speed and cost of each transfer, while recording the transfer parameters that were chosen, such as the number of parallel copy instances, and the efficiency of the cloud provider's transport network, the time of day, the segment city pairs, the amount of storage and related compute functions, the size and type of compute instances, and the pricing of the compute instances and transfer charges, all of which the software records in its database. Along with the ongoing information about the transfer and user choices, the software application can populate a database 303 of the relative information about all of the parameters and their effect on the performance measures of transfer speed and cost.

As a result of these methods, the software application can build a database 303 of completed transfers and their elements to enable the most efficient time and cost of cloud data transfers. The resulting relationships of the data for each transfer can be mined for use with a machine learning model 301 to produce more efficient choices for the succeeding transfers.

The software application further uses the machine-learning model 301 to select parameters that can improve transfer speeds or costs, such as by modifying the sizes for the division of file sizes, and the cloud conditions available to it. Alternatively, the software application can use the machine-learning model 301 and artificial intelligence programs available to it in the cloud, offered by one or more cloud application providers.

Figure 4:
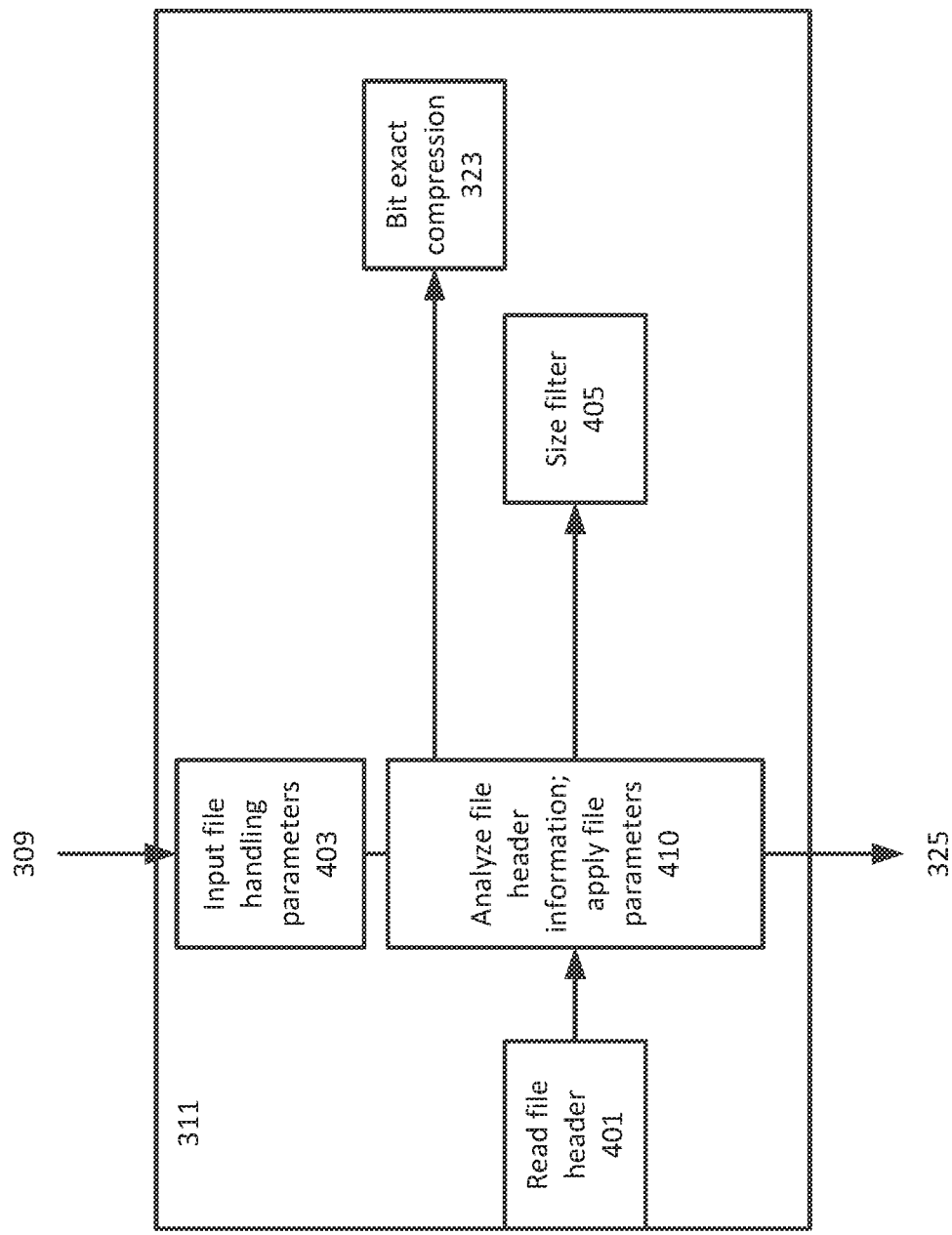
FIG. 4 is a diagram for the file storage and handling function process of FIG. 2.

The flow of data in the software application as executed on a destination computer system 300 will be described with reference to FIGS. 3 and 4.

1. The software application can initially be installed on the destination computer system 300 and stored in a storage, such as in a file system. In some embodiments, the destination computer system 300 is a cloud service where data is to be transferred to. The cloud service may involve setting up an account, selecting an environment including an initial number of compute instances and machine instances, setting up a data storage option as a database 303, and setting up a machine learning model 301. In some embodiments, the machine learning model may be trained with available historical data offline to provide an initial machine learning model. The software application can render data for display on a display device including file folder icons in a graphic user interface (GUI) 305.

2. The graphical user interface 305 can provide a function for selecting a data file folder displayed in the graphic user interface and for dragging and dropping it to a destination folder and for selecting a speed for the data transfer. The software application can then initiate the transfer based on predetermined parameters.

3. The transfer is initiated with a set of default parameters in the software application's database 303, including the number of simultaneous transmissions to accomplish the desired speed, the number of compute resources available, the location of the compute resources and associated transfer program for each transfer, and the optimal size of files to be transmitted.

4. In some embodiments, a software developer control process 309 can load the predetermined, or default, set of parameters in the database 303 as the initial parameters to be used in the initial transfers, including the file handling information. The file handling information includes whether the file is of a type that can be bit exact compressed and what processing is to be applied to the files based on the size of the file in bytes.

5. The graphical user interface 305 can provide a function for entering information for a desired data transfer, including the folder to be transferred, the locations of the transfer's origin and destination, and the desired speed of transfer.

6. The software application can parse the file folder to analyze the size and nature of each file in the folder, initiating a storage an file handling process 311. FIG. 4 is a diagram for the file storage and handling function process of FIG. 2:

a. The storage and file handling process 311 begins by reading file header information 401 and, in 410, analyzing the header information of the first file in the folder, applying an algorithm that selects a file handling method for each file and, in 403, receives file handling parameter information.

b. The storage and file handling process 410 first determines if the file is of a type that is to be subjected to bit exact compression. If so, the bit exact compression 323 is applied, and the file is passed to the file transport function 325.

c. If bit exact compression is not applied, the storage and file handling process 410 uses the handling information to select the file based on size determined in a size filter 405. If the file is below a certain large file size based on a parameter retrieved from the database 303 and also above another small file size parameter retrieved from the database (a "medium" file), the file is passed to the transport function 325.

d. If the file is larger than a "medium" file, as determined by a large file size parameter, the file handling process 410 selects the file for different treatment based on its size. A large file breakup process 321a breaks a "large" file, above a certain large file size parameter, into multiple constituent parts, limited by the upper number of parts as determined by a parameter in the database 303. The number of parts is designed to optimize the speed of these file parts to be sent. In one embodiment, each part is of substantially equal size, except for the last part, which is the remainder. Each part is passed to the file transport function 325.

e. If the file is not of a "large" or "medium" size, the file is "small" and the small file aggregate process 321b can aggregate the file with a number of other files or parts of files. The number of files or parts of files is optimized to a preferred predetermined file part size for optimal transfer. Each aggregated set of "small" files or file parts is passed to the file transport function 325.

7. Information about the origin, destination, the file or part size and type, along with the number of transport sessions are matched with the parameters from the database 303 and recorded in the database 303. In some embodiments, the number of transport sessions can be changed dynamically for each data transmission, or on demand depending on circumstances, such as changes in communications load, types of data being transmitted.

8. A data transfer is initiated using the file loading parameters and instructions from 309. In some embodiments, the speed of previous transfers can be retrieved from the database and used to determine if a change of parameter values, in particular, a new large file size parameter and a new small file size parameter, can better achieve the desired speed.

9. The parallel transport function 325 initiates a series of parallel transfers of the files, their parts, or their losslessly compressed elements. In some embodiments, the machine and computing instances can be set with enough memory such that the transferred data will be written to the destination storage without the need for buffering.

10. The transfer is completed when the files arrive at their destination 327 and the transfer software application reassembles them.

11. The measure process 329 measures the time of completion of the transfer or partial completion, as information is available.

12. The transfer completion information is entered into the database 303.

Figure 5:
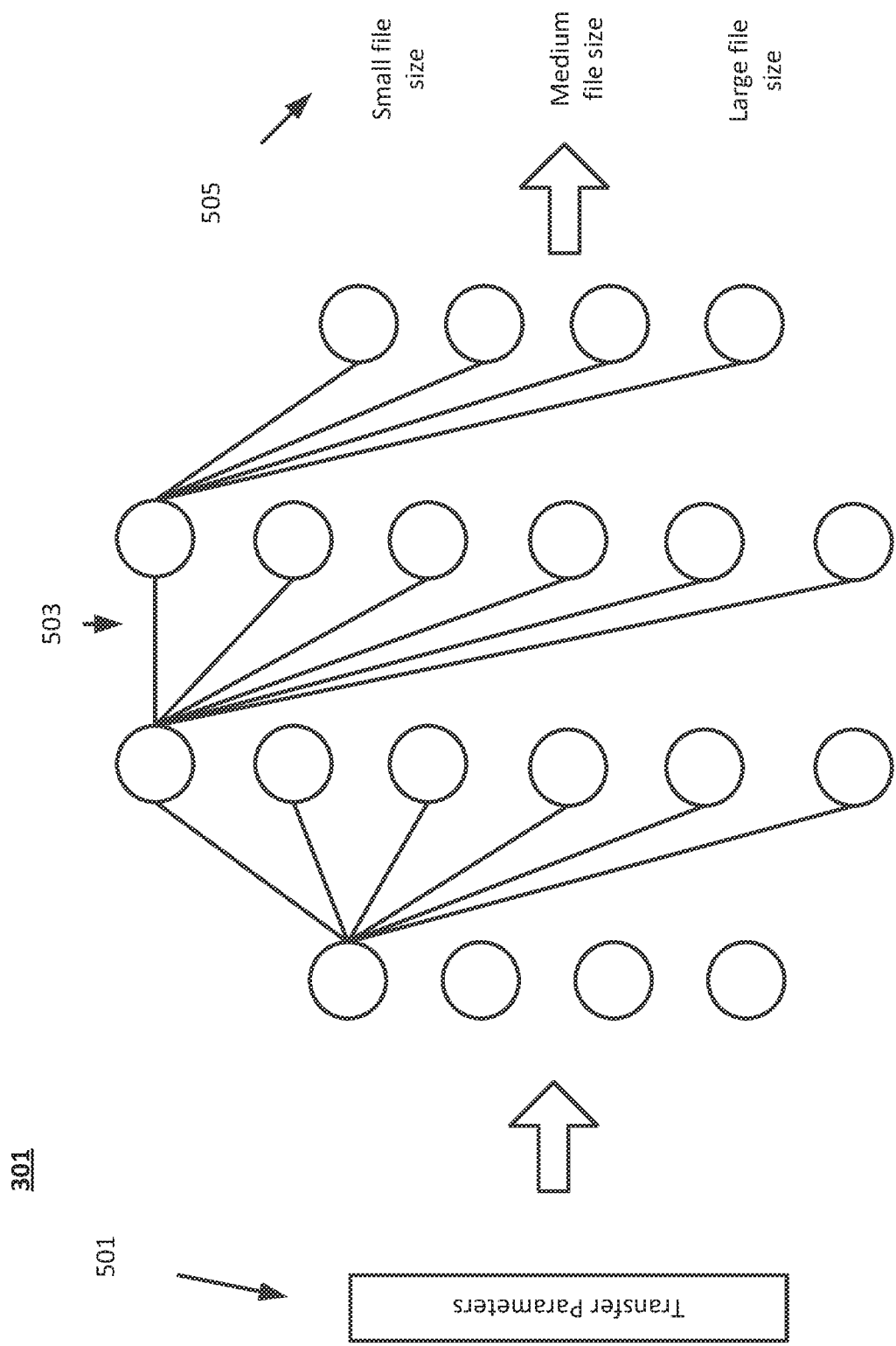
FIG. 5 is a diagram of an exemplary machine learning apparatus.

13. The preferred machine learning model is supervised and adaptive. The software application can include a supervised machine learning model 301. FIG. 5 is a diagram of an exemplary machine learning apparatus. Although FIG. 5 shows a multi-layered neural network 503, the machine learning model may use one of several types of supervised learning algorithms including, but not limited to, linear regression, logistic regression, Support Vector Machines (SVMs), Decision Trees and Random Forests. The machine learning model performs online learning, in which the model is trained incrementally as new transfer input values are fed sequentially. Inputs 501 to the machine learning model 301 may include at least one of the desired transfer speed and cost of transfer, the parameter values of small, medium, and large file size thresholds, the number of compute instances and amount of memory, the number of parallel transfer paths (machine instances), the number of small files to be aggregated, and the measured speed of transfers. The outputs 501 of the machine learning model 301 may include revised parameter values of small, medium, and large file size thresholds. If the results of each transfer are faster or slower than the machine learning model 301, the software application may run a regression on each element used in the transfer against the speed of the transfer. The resulting regressions are recorded and compared to previous regressions. The faster transfers are compared to the previous regression results, and the file transfer parameters may be adjusted upward or downward. For example, after measuring the actual file transfer speed with existing parameters, one or more file handling parameters is adjusted. The model is run again with the next transfer and the transfer speed is measured and compared.

14. The database 303 is updated with the new default parameters to be used in subsequent transfers, thus repeating the cycle.

Numerous modifications and variations of the present invention are possible in light of the above teachings. It is therefore to be understood that within the scope of the appended claims, the invention can be practiced otherwise than as specifically described herein.

The invention claimed is:

1. A system that transfers data to meet a desired transfer speed and a desired transfer cost, the system comprising:
    circuitry configured to
        select one or more folders containing one or more files having the data,
        receive input of the desired transfer speed and the desired transfer cost,
        select a destination memory device,
        read a file header of the one or more files for the selected one or more folders to obtain header information,
        determine a file type and a file size based on the header information,
        determine a large file size threshold, having units of file size, based on the input desired transfer speed, the input desired transfer cost, and a previously measured transfer speed,
        when the file size of a file of the one or more files is above the determined large file size threshold, divide the file into two or more file parts in accordance with the file type,
        transfer the one or more files, including any of the file parts, using a number of parallel transport machine instances,
        measure a total speed of the transfer, and
        store the measured total speed for use as the previously measured transfer speed,
    wherein the circuitry is further configured to
        determine a small file size threshold, having the units of file size, based on the input desired transfer speed, the input desired transfer cost, and the previously measured transfer speed,
        when the file size of a file of the one or more files is below the determined small file size threshold, aggregate the respective file with at least one other file or file part to obtain an aggregated file, and
        transfer, from a source device to the destination memory device, the one or more files including the aggregated file using the number of parallel transport machine instances, which are executing on the destination memory device.

2. The system of claim 1, wherein the determined large file size threshold is less than a memory size of the destination memory device such that there is no buffering.

3. The system of claim 1, wherein the circuitry is further configured to dynamically adjust the number of parallel transfer machine instances for each file of the one or more files to meet the input desired transfer speed and the input desired transfer cost.

4. The system of claim 1, wherein the circuitry is further configured to vary the determined large file size threshold based on a history of the measured transfer speed and a previous large file size threshold.

5. The system of claim 1, wherein the circuitry is further configured to determine transfer parameters including one or more of efficiency of a cloud provider's transfer network, a time of day, segment city pairs, an amount of storage and related compute functions, a size and type of compute instances, and pricing of the compute instances and transfer charges, adjust one or more values of the transfer parameters to meet the input desired transfer speed and the input desired transfer cost, and transfer the one or more files using the adjusted transfer parameters.

6. The system of claim 1, wherein the circuitry is further configured to determine whether the determined file type indicates a file that can be bit-exact compressed, when the file size of a file of the one or more files is above the determined large file size threshold, apply bit-exact compression to the respective file, and transfer the one or more files including the compressed file using the number of the parallel transport machine instances.

7. The system of claim 6, wherein the file type includes a raw image file, and wherein the circuitry is further configured to apply the bit-exact compression to the raw image file.

8. The system of claim 1, wherein the circuitry includes a machine learning model, the circuitry is further configured to determine the large file size threshold based on the input desired transfer speed, the input desired transfer cost, and the previously measured transfer speed using the machine learning model, and the circuitry is further configured to transfer the one or more files including the file parts using the number of parallel transport machine instances, measure and store the total speed of the transfer, and train the machine learning model with the stored measured total speed.

9. The system of claim 1, wherein the circuitry includes a machine learning model, the circuitry is further configured to determine the small file size threshold based on the input desired transfer speed, the input desired transfer cost, and the previously measured transfer speed using the machine learning model, and the circuitry is further configured to transfer the one or more files including the aggregated file using the number of parallel transport machine instances, measure and store the total speed of the transfer, and train the machine learning model with a number of small files in the aggregated file and the stored measured total speed.

10. A method for a system that includes circuitry that transfers data to meet a desired transfer speed and a desired transfer cost, the method being performed by the circuitry and comprising:

selecting one or more folders containing one or more files having the data;

receiving input of the desired transfer speed and the desired transfer cost;

selecting a destination memory device;

reading a file header of the one or more files for the selected one or more folders to obtain header information;

determining a file type and a file size based on the header information;

determining a large file size threshold, having units of the size, based on the input desired transfer speed, the input desired transfer cost, and a previously measured transfer speed;

when the file size of a file of the one or more files is above the determined large file size threshold, dividing the file into two or more file parts in accordance with the file type;

transferring the one or more files, including any of the file parts, using a number of parallel transport machine instances;

measuring a total speed of the transfer; and storing the measured total speed for use as the previously measured transfer speed, wherein the method further comprises:

determining, by the circuitry, a small file size threshold, having the units of file size, based on the input desired transfer speed, the input desired transfer cost, and the previously measured transfer speed;

when the file size of a file of the one or more files is below the determined small file size threshold, aggregating, by the circuitry, the respective file with at least one other file or file part to obtain an aggregated file; and transferring, by the circuitry, the one or more files including the aggregated file using the number of parallel transport machine instances.

11. The method of claim 10, wherein the determined large file size threshold is less than a memory size of the destination memory device such that there is no buffering.

12. The method of claim 10, further comprising:

dynamically adjusting, by the circuitry, the number of parallel transport machine instances for each file of the one or more files to meet the input desired transfer speed and the input desired transfer cost.

13. The method of claim 10, further comprising:

varying, by the circuitry, the determined large file size threshold based on a history of the measured transfer speed and a previous large file size threshold.

14. The method of claim 10, further comprising:

determining, by the circuitry, transfer parameters including one or more of efficiency of a cloud provider's transfer network, a time of day, segment city pairs, an amount of storage and related compute functions, a size and type of compute instances, and pricing of the compute instances and transfer charges;

adjusting, by the circuitry, one or more values of the transfer parameters to meet the input desired transfer speed and the input desired transfer cost; and transferring, by the circuitry, the one or more files using the adjusted transfer parameters.

15. The method of claim 10, further comprising:

determining, by the circuitry, whether the determined file type indicates a file that can be bit-exact compressed;

when the file size of a file of the one or more files is above the determined large file size threshold, applying, by the circuitry, bit-exact compression to the respective file; and transferring, by the circuitry, the one or more files including the compressed file using the number of the parallel transport machine instances.

16. The method of claim 15, wherein the file type includes a raw image file, and wherein the method further comprises applying, by the circuitry, bit-exact compression to the raw image file.

17. The method of claim 10, further comprising:
determining, by the circuitry, the large file size threshold based on the input desired transfer speed, the input desired transfer cost, and the previously measured transfer speed using a machine learning model;
transferring, by the circuitry, the one or more files including the file parts using the number of parallel transport machine instances;
measuring and storing, by the circuitry, the total speed of the transfer; and
training, by the circuitry, the machine learning model with the stored measured total speed.

18. The method of claim 10, further comprising:
determining, by the circuitry, the determined small file size threshold based on the input desired transfer speed, the input desired transfer cost, and the previously measured transfer speed using a machine learning model;
transferring, by the circuitry, the one or more files including the aggregated file using the number of parallel transport machine instances;
measuring and storing, by the circuitry, the total speed of the transfer; and
training, by the circuitry, the machine learning model with a number of small files in the aggregated file and the stored measured total speed.

* * * * *